United States Patent
You et al.

(10) Patent No.: US 7,885,678 B2
(45) Date of Patent: Feb. 8, 2011

(54) UPLINK (UL) POWER CONTROL APPARATUS AND METHOD IN BROADBAND WIRELESS COMMUNICATION SYSTEM

(75) Inventors: Hwa-Sun You, Suwon-si (KR); Ji-Ho Jang, Yongin-si (KR); Jae-Ho Jeon, Seongnam-si (KR); Seung-Joo Maeng, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 860 days.

(21) Appl. No.: 11/803,119

(22) Filed: May 11, 2007

(65) Prior Publication Data

US 2007/0265026 A1 Nov. 15, 2007

(30) Foreign Application Priority Data

May 12, 2006 (KR) .............. 10-2006-0042958

(51) Int. Cl.
*H04B 7/00* (2006.01)
(52) U.S. Cl. .................... 455/522; 455/69; 455/70; 370/318; 370/320
(58) Field of Classification Search .......... 455/522, 455/69–70; 370/318, 320
See application file for complete search history.

(56) References Cited

U.S. PATENT DOCUMENTS

| | | | |
|---|---|---|---|
| 6,490,460 B1 | 12/2002 | Soliman | |
| 6,512,931 B1 | 1/2003 | Park et al. | |
| 6,639,934 B1 | 10/2003 | Engstrom et al. | |
| 6,654,613 B1 | 11/2003 | Maeng et al. | |
| 6,697,634 B1 | 2/2004 | Hayashi | |
| 7,020,483 B2 | 3/2006 | Oestreich | |
| 2002/0137535 A1* | 9/2002 | Hunzinger | ........... 455/522 |
| 2002/0196766 A1 | 12/2002 | Hwang et al. | |
| 2006/0040619 A1 | 2/2006 | Cho et al. | |

FOREIGN PATENT DOCUMENTS

| | | |
|---|---|---|
| EP | 1 077 531 | 2/2001 |
| EP | 1077531 A1 * | 2/2001 |
| EP | 1 467 499 | 10/2004 |
| EP | 1 628 413 | 2/2006 |
| EP | 1 653 634 | 5/2006 |
| KR | 1020010043342 | 5/2001 |
| KR | 1020020061529 | 7/2002 |
| KR | 1020050069848 | 7/2005 |
| KR | 1020060016042 | 2/2006 |
| RU | 2 127 951 | 3/1999 |
| RU | 2 198 465 | 9/2002 |
| WO | WO 92/21196 | 11/1992 |
| WO | WO 00/48336 | 8/2000 |
| WO | WO 00/54417 | 9/2000 |

* cited by examiner

*Primary Examiner*—Edward Urban
*Assistant Examiner*—Fayyaz Alam
(74) *Attorney, Agent, or Firm*—The Farrell Law Firm, LLP

(57) ABSTRACT

An uplink (UL) power control apparatus and method in a broadband wireless communication system are provided. The Mobile Station (MS) includes a power controller for calculating a power compensation value using a last transmit power in a previous closed loop power control when a power control mode is changed to an open loop power control, and determining a transmit power according to the open loop power control using the power compensation value; and a transmitter for adjusting and transmitting the transmit power of a UL signal under control of the power controller.

15 Claims, 3 Drawing Sheets

UPLINK (UL) POWER CONTROL APPARATUS AND METHOD IN BROADBAND WIRELESS COMMUNICATION SYSTEM

PRIORITY

This application claims priority under 35 U.S.C. §119 to an application filed in the Korean Intellectual Property Office on May 12, 2006 and assigned Serial No. 2006-42958, the contents of which are incorporated herein by reference.

BACKGROUND OF THE INVENTION

1. Field of the Invention

The present invention relates generally to an uplink (UL) power control apparatus and method in a broadband wireless communication system, and in particular, to an apparatus and method for stably switching a UL power control mode in the broadband wireless communication system.

2. Description of the Related Art

Research to provide users with varying Quality of Service (QoS) at a high data rate is an objective of the fourth generation (4G) communication systems. Specifically, research into the high rate support service to guarantee mobility and QoS in the 4G communication systems, such as wireless Local Area Networks (LAN) and wireless Metropolitan Area Networks (MAN) guaranteeing relatively high data rates, has been under way.

The Institute of Electrical and Electronics Engineers (IEEE) 802.16 communication system adopts an Orthogonal Frequency Division Multiplexing (OFDM) scheme and an Orthogonal Frequency Division Multiple Access (OFDMA) scheme to support the broadband transmission network in physical channels of the wireless MAN system. Applying the OFDM/OFDMA scheme to the wireless MAN system, the IEEE 802.16 communication system enables the high data transmission by transmitting the physical channel signal using a plurality of subcarriers.

In the OFDMA communication system, uplink (UL) signals may act as excessive interference to other Mobile Stations (MSs) or neighbor cells according to the transmit power, or cause a decrease in the Base Station (BS) reception power. Thus, an appropriate power control is required according to the required Carrier to Interference and Noise Ratio (CINR).

Typically, the power control mode can be broadly classified into a closed loop power control and an open loop power control.

The closed loop power control compensates for the UL transmit power of the MS under the control of the BS. However, the closed loop power control may degrade the accuracy of the power control in the packet communication system. The BS determines the power control range using the CINR value of the packets received in the UL. Even when the BS occasionally receives the packets and performs the power control for every packet reception, the accuracy of the power control may degrade because there arises a difference between the time of the UL packet transmission from the MS and the time of the power control direction from the BS.

In the open loop power control, on the assumption that the path loss of the uplink is equal to the path loss of the downlink (DL), the MS adjusts the transmit power of the UL signal by estimating the DL path loss by itself. That is, the MS adjusts the UL power using the required CINR received from the BS, interference and noise level information of the uplink, and the DL path loss. The BS can additionally direct the fine adjustment to the MS based on the CINR value of the received packets.

As discussed above, the open loop power control can greatly improve the accuracy of the power control thanks to the MS's own transmit power adjustment and the BS's additional power adjustment direction, compared to the closed loop power control.

Therefore, the MS in the OFDMA communication system performs the closed loop power control in the initial network entry phase, and then performs the open loop power control by switching the power control mode.

FIG. 1 depicts a conventional switching procedure from the closed loop power control to the open loop power control in a broadband wireless communication system.

At the initial access, MS 10 of FIG. 1 receives Downlink Channel Description/Uplink Channel Description (DCD/UCD) messages from BS 20 in step 101, and acquires information (parameters) required for the initial access from the received messages. In doing so, the MS 10 can acquire parameters relating to the initial ranging. The MS 10 receives UL interference and noise level information from the BS 20 in step 103.

In step 105, the MS 10 sets an initial transmit power based on the information received from the BS 20. In step 107, the MS 10 sends an initial ranging code to the BS 20 with the initial transmit power. The BS 20 sends a ranging response RNG_RSP message to the MS 10 in reply to the initial ranging code in step 109. The BS 20 sends a band allocation message CDMA Alloc IE for the ranging request to the MS 10 in step 111.

When the RNG_RSP message is not received within a present time after the initial ranging code is transmitted, the MS 10 retransmits the initial ranging code at an increased transmit power level. When the RNG_RSP message is received within the preset time, the MS 10 performs Network Entry (N/E) procedures starting from the initial ranging in step 113. The N/E procedures include the initial ranging RNG_REQ/RSP, the basic capability negotiation SBC_REQ/RSP, and the authentication PKM_REQ/RSP.

After the N/E procedures, the MS 10 enters the closed loop power control mode which adjusts the transmit power according to power control IE from the BS 20 in step 115.

The BS 20 checks the open loop power control capability of the MS 10 through the basic capability negotiation procedure. After the N/E procedures, the BS 20 requests the MS 10 to switch to the open loop power control mode by sending Power control Mode Change ReSPonse (PMC_RSP) message in step 117. The MS 10 transmits Power control Mode Change REQuest (PMC_REQ) message to the BS 20 in response in step 119, and changes the power control mode to the open loop power control in step 121.

The MS 10 calculates the transmit power P according to the open loop power control based on Equation (1).

$$P = L + C/N + NI - 10\log_{10}(R) + \text{Offset\_SS}_{perSS} + \text{Offset\_BS}_{perSS} \quad (1)$$

Parameters in Equation (1) are defined as below:

P: transmit power (dBm) per subcarrier of UL burst.

L: average estimation value for propagation path loss which is calculated using the total receive power measured through active subcarriers of the preamble and Efficient Isotropic Radiation Power parameter from the BS (BS_EIRP). BS_EIRP parameter indicative of the BS transmit power is received using a DCD message.

C/N: received CINR value required by Modulation and Coding Scheme (MCS) level of the UL burst.

NI: estimation value of the average interference and noise power (dBm) per subcarrier measured at the BS, which is provided to every MS as common information.

R: number of repetitions according to the MCS level

Offset_SS$_{perSS}$: MS power compensation value controlled by the MS, which is always zero in the passive open loop power control mode.

Offset_BS$_{perSS}$: BS power compensation value controlled by the BS. When this value is set using PMC_RSP message, Offset_BS$_{perSS}$ is substituted with the value of PMC_RSP message. When the BS directs the power fine adjustment using the power control IE, the accumulated power adjustment values in the power control IE are used as Offset_BS$_{perSS}$ value. Alternatively, the accumulation of the power adjustment values in RNG_RSP message received from the BS can be used as Offset_BS$_{perSS}$ value.

The conventional art has a number of drawbacks.

When a Relay Station (RS) (or Repeater) is installed to the system, and particularly when the transmit power of the RS downlink (RS→MS) differs from the transmit power of the RS uplink (RS→BS), the open loop power control may not normally work. This is because the open loop power control fundamentally assumes that the DL propagation path loss is equal to the UL propagation path loss.

If the RS DL transmit power is greater than the UL transmit power, the MS estimates the UL propagation path loss by measuring the DL propagation path loss. Accordingly, the estimated UL propagation path loss is less than the actual path loss. In this case, when the open loop power control is conducted based on Equation (1), the MS transmits the UL packet with much less power than the required transmit power. As a result, the BS may not receive the UL signal or the error rate of the UL packet may increase. Particularly, when the power control mode is changed (closed loop power control→open loop power control) with the different propagation path losses between the downlink and the uplink, its influence is considerable.

If the set BS_EIRP value of DCD is greater than the actual BS output value, then the MS calculates the DL path loss greater than the actual value. In this case, since the unnecessarily large UL transmit output may be set in the open loop power control, this can exert influence on other MS signals in view of the BS reception. In other words, when the BS performs an Automatic Gain Control (AGC) before a Fast Fourier Transform (FFT) stage, the AGC operates based on the summation of all UL signal powers. Thus, this may act as the interference to the MS signal having the relatively weak receive signal.

By contrast, when the set BS_EIRP value of DCD is less than the actual BS output value, the calculated MS DL path loss becomes less than the actual value. In this case, since the less UL transmit output than is necessary can be set in the open loop power control, the BS may not receive the MS signal.

As discussed above, since the open loop power control can compute the improper transmit power because of the various external factors, what is needed is a method for stably accomplishing the open loop power control. Furthermore, such errors are notable when the closed loop power control is changed to the open loop power control. Therefore, it is required to properly maintain the transmit power when the power control mode is changed.

SUMMARY OF THE INVENTION

An aspect of the present invention is to substantially solve at least the above problems and/or disadvantages and to provide at least the advantages below. Accordingly, an aspect of the present invention is to provide an apparatus and method for stably changing a power control mode in a broadband wireless communication system.

Another aspect of the present invention is to provide an apparatus and method for stably changing from a closed loop power control mode to an open loop power control mode in a broadband wireless communication system.

A further aspect of the present invention is to provide an apparatus and method for stably performing an open loop power control in a broadband wireless communication system.

The above aspects are achieved by providing a Mobile Station (MS) in a wireless communication system, which includes a power controller for calculating a power compensation value using a last transmit power in a previous closed loop power control when a power control mode is changed to an open loop power control, and determining a transmit power according to the open loop power control using the power compensation value; and a transmitter for adjusting and transmitting the transmit power of an uplink (UL) signal under control of the power controller.

According to one aspect of the present invention, a UL power control method in a wireless communication system includes calculating a power compensation value using a last transmit power in a previous closed loop power control when a power control mode is changed to an open loop power control; and determining a transmit power according to the open loop power control using the power compensation value.

According to another aspect of the present invention, a UL power control method in a wireless communication system includes acquiring, when a power control mode is changed to an open loop power control, a last transmit power value $P_{Tx,CL\_last}$ in a closed loop power control mode, a path loss value $L_{OL\_init}$ estimated at a Mobile Station (MS), a latest Noise and Interference (NI) value $NI_{OL\_init}$ received from a Base Station (BS), a required CINR value $C/N_{CL\_last}$ for a last Modulation and Coding Scheme (MCS) level in the closed loop power control mode, and a number of repetitions $R_{CL\_last}$ according to the last MCS level; and calculating a power compensation value Offset_SS$_{perSS}$ controlled by the MS using the acquired values based on $$\text{Offset\_SS}_{perSS} = P_{Tx,CL\_last} - (L_{OL\_init} + NI_{OL\_init}) - C/N_{CL\_last} + 10\log_{10}(R_{CL\_last}).$$

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
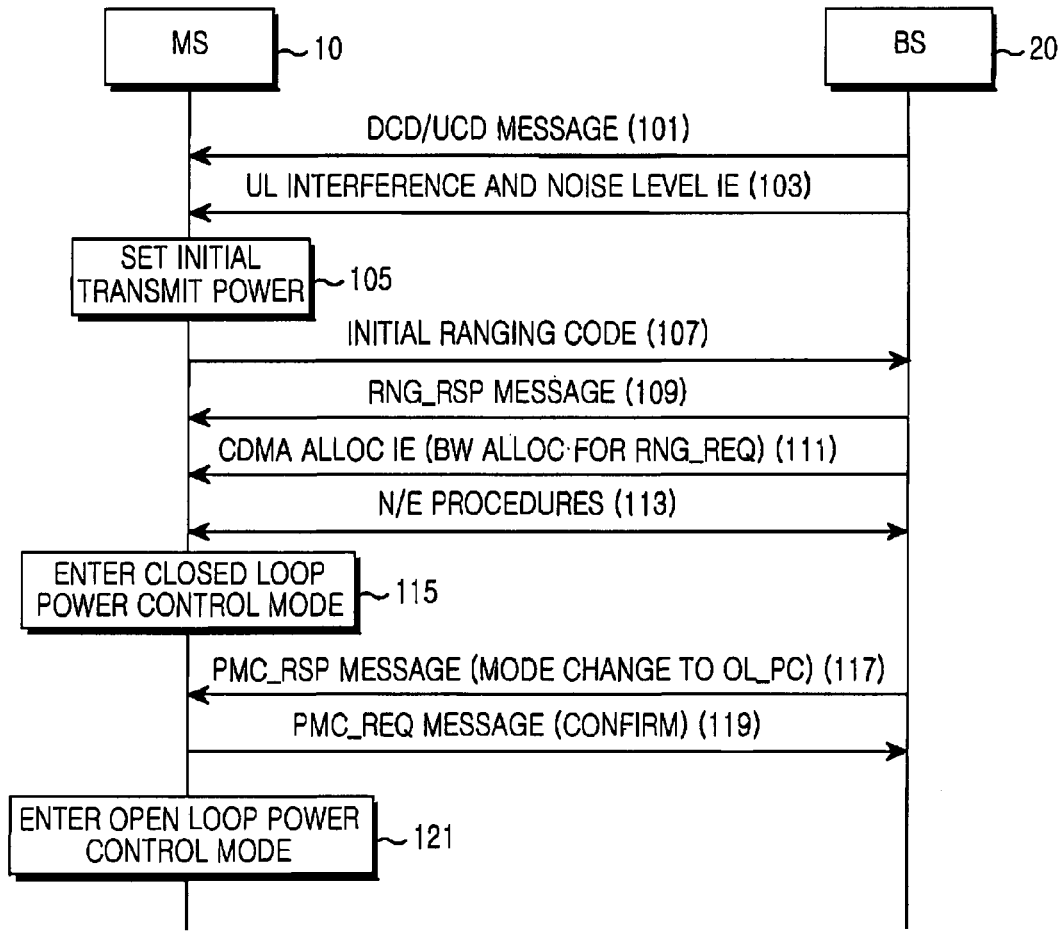
FIG. 1 illustrates a conventional procedure for switching from a closed loop power control to an open loop power control in a broadband wireless communication system.

Preferred embodiments of the present invention will be described herein below with reference to the accompanying drawings. In the following description, well-known functions or constructions are not described in detail since they would obscure the invention in unnecessary detail.

The present invention provides a method for stably performing an open loop power control in a broadband wireless communication system.

As discussed earlier, in the open loop power control based on Equation (1), the improper transmit power is calculated when the path losses of the uplink and the downlink are not equal to each other. Typically, when Relay Station (RS)(or Repeater) is used between Base Station (BS) and Mobile Station (MS), the simplest method for normally accomplishing the open loop power control is to set the DL gain and the UL gain of the RS to the same value.

The drawbacks of the open loop power control can be addressed by gradually increasing the transmit power in the bandwidth request ranging or the periodic ranging which is carried out before the actual transmission of a UL burst, similar to the initial ranging.

The MS requests a UL bandwidth through the bandwidth request ranging. In the bandwidth request ranging, the transmit power is gradually increased similar to the procedure used during the initial ranging. Specifically, the MS increases the transmit power of the bandwidth request ranging until a BS reception level reaches a proper level. Accordingly, in a later UL burst transmission, the BS reception level can be maintained at the proper level.

The MS also performs the periodic ranging even while no UL packet is transmitted. In this case, like in the initial ranging, the transmit power is gradually raised. Specifically, the MS increases the transmit power of the periodic ranging until the BS reception level reaches a proper level. Accordingly, in a later UL burst transmission, the BS reception level can be maintained at a proper level.

The above methods address the drawbacks of the open loop power control using well-known techniques. Alternatively, a PMC_RSP message can be utilized. In more detail, the Offset_BS$_{perSS}$ value of the PCM_RSP message is set to the difference between the DL gain and the UL gain of the RS. Since every MS connected to the BS and the RS enters the open loop power control mode and transmits signals with high power up to the Offset_BS$_{perSS}$ value of the PMC_RSP message, interference on other cells may rise momentarily. However, the MS establishing a link to the BS can lower the transmit power using the constant power control IE, and the MS establishing a link to the RS can maintain a certain reception power level in view of the BS reception.

Besides the above-mentioned methods, the MS can calculate by itself the reliable transmit power in the open loop power control, which is described in detail by referring to the drawings.

Figure 2:
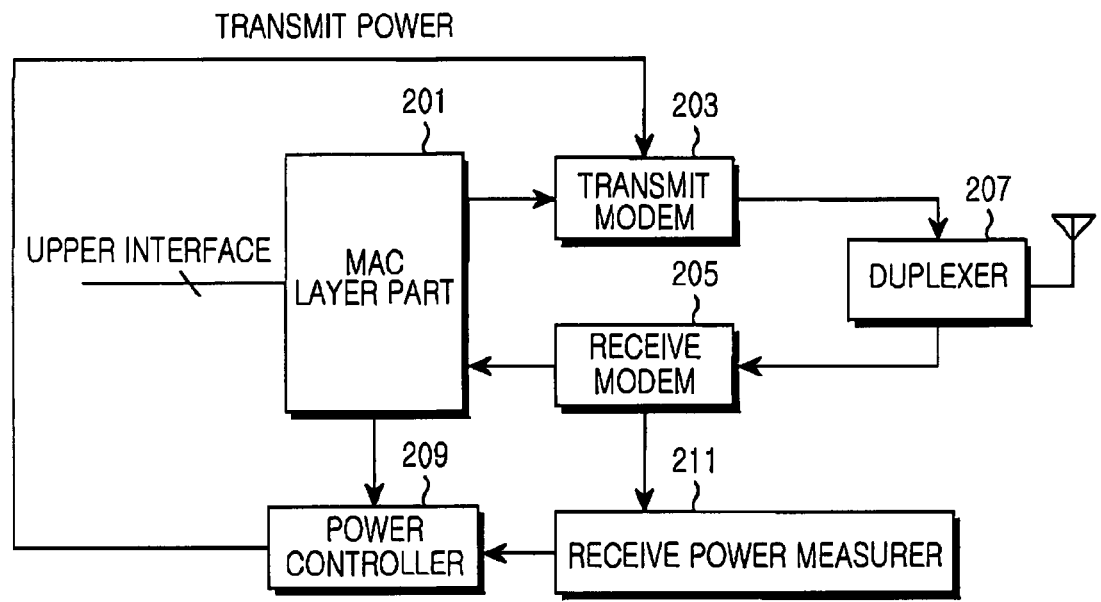
FIG. 2 illustrates Mobile Station (MS) in a broadband wireless communication system according to the present invention.

FIG. 2 is a block diagram of MS in the broadband wireless communication system according to the present invention. The following explanation describes a Time Division Multiplexing (TDD)-OFDMA system by way of example. Note that the present invention is easily applicable to every power control system such as a Frequency Division Duplexing (FDD)-OFDMA system and a hybrid system using both TDD and FDD.

The MS of FIG. 2 includes a Media Access Control (MAC) layer part 201 connected to an upper layer, a transmit modem 203, a receive modem 205, a duplexer 207, a power controller 209, and a receive power measurer 211.

The MAC layer part 201 serves to receive transmit data from the upper layer (e.g., IP layer part) and to provide the transmit data to the transmit modem 203 by processing the transmit data according to a connection scheme of the transmit modem 203. The MAC layer part 201 receives receive data from the receive modem 205, processes and provides the receive data to the upper layer according to a connection scheme of the upper layer. According to the present invention, the MAC layer part 201 provides information required for the power control to the power controller 209. The information required for the power control can include information received from the BS, and information generated based on the information received from the BS.

The transmit modem 203 includes a channel coding block, a modulation block, a Radio Frequency (RF) transmit block, and so forth. The transmit modem 203 transforms data (burst data) fed from the MAC layer part 201 to a form for the radio section transmission and provides the transformed data to the duplexer 207. The channel encoding block can include a channel encoder, an interleaver, and a modulator. The modulation block can include an Inverse FFT (IFFT) operator for mapping the transmit data to a plurality of orthogonal subcarriers. The RF transmit block can include a filter and an RF front-end unit.

The receive modem 205 includes an RF receive block, a demodulation block, and a channel decoding block. The receive modem 205 restores data from the radio section signals from the duplexer 207 and provides the restored data to the MAC layer part 201. The RF receive block can include a filter and an RF front-end unit. The demodulation block can include an FFT operation for extracting data mapped to the subcarriers. The channel decoding block can include a demodulator, a deinterleaver, and a channel decoder.

The duplexer 207 provides the receive signal (DL signal) from an antenna to the receive modem 205 and provides the transmit signal (UL signal) from the transmit modem 203 to the antenna according to the TDD scheme.

The receive power measurer 211 receives subcarrier values of the preamble received from the BS from the receive modem 205, measures the receive power using the preamble subcarrier values, and provides the measured receive power to the power controller 209. The measured receive power is used to calculate the UL path loss L of Equation (1).

The power controller 209 carries out the closed loop power control or the open loop power control. In the closed loop power control, the power controller 209 determines the UL transmit power according to a power control command received from the BS and provides the UL transmit power to the transmit modem 203. The transmit modem 203 sends the UL signal by adjusting the transmit power of the UL signal according to the transmit power from the power controller 209. The transmit power can be regulated at one of a baseband stage, an Intermediate Frequency (IF) stage, and an RF stage.

In the open loop power control, the power controller 209 determines the UL transmit power based on Equation (1) and provides the determined UL transmit power to the transmit modem 203. When the transmit power is determined based on Equation (1), information relating to the CINR value required by the MCS level of the transmitted UL burst and the average interference and noise power estimation value (NI) per subcarrier at the BS are required, which are supplied from the MAC layer part 201.

When changing from the closed loop power control mode to the open loop power control mode, the power controller 209 computes the MS power compensation value Offset_SS$_{perSS}$ of Equation (1) based on Equation (2) to prevent the abrupt change of the transmit power according to the power control mode switching, and performs the open loop power control by reflecting the computed MS power compensation value into Equation (1).

$$\text{Offset\_SS}_{perSS} = P_{Tx,CL\_last} - P_{Tx,OL\_init} + \Delta CINR_{req} \quad (2)$$

The parameters in Equation (2) are defined as below.

$P_{Tx,CL\_last}$: last transmit power value in the closed loop power control mode $P_{Tx,OL\_init}$: initial transmit power estimation value after changing to the open loop power control mode, which can be expressed as Equation (3).

$$P_{Tx,OL\_init} = L_{OL\_init} + C/N_{OL\_init} + NI_{OL\_init} - 10\log_{10}(R_{OL\_init}). \quad (3)$$

$\Delta CINR_{req}$: a difference between the required CINR value for the MCS level of the transmitted UL burst and the required CINR value for the last MCS used in the closed loop power control mode, which can be expressed as Equation (4).

$$\Delta CINR_{req} = \quad (4)$$
$$C/N_{OL\_init} - C/N_{CL\_last} - (10\log_{10}(R_{OL\_init}) - 10\log_{10}(R_{CL\_last}))$$

Accordingly, Equation (2) can be re-expressed as Equation (5).

$$\text{Offset\_SS}_{perSS} = \quad (5)$$
$$P_{Tx,CL\_last} - (L_{OL\_init} + NI_{OL\_init}) - C/N_{CL\_last} + 10\log_{10}(R_{CL\_last})$$

The parameters in Equation (5) are defined as follows. $P_{Tx,CL\_last}$ is the last transmit power value in the closed loop power control mode. $L_{OL\_init}$ is the path loss estimated by the MS when switching from the closed loop power control to the open loop power control. $NI_{OL\_init}$ is the latest Noise and Interference (NI) value received at the BS. $C/N_{CL\_last}$ is the required CINR value for the last MCS level (modulation and FEC) in the closed loop power control mode. $R_{CL\_last}$ is the number of repetitions (repetition factor) according to the last MCS level.

As above, the power controller 209 calculates the MS power compensation value Offset_SS$_{perSS}$ based on Equation (2) or Equation (5), and performs the open loop power control by reflecting the MS power compensation value. As one can see from Equation (2), the MS power compensation value of Equation (1) in the open loop power control is set to the sum of the difference between the last transmit power value in the previous closed loop power control mode and the initial transmit power value estimated by changing to the open loop power control mode, and the difference between the required CINR values based on the MCS difference, rather than to zero.

The MS power compensation value in Equation (2) and Equation (5) is calculated only once when the power control mode is changed from the closed loop power control to the open loop power control, and then is maintained until the power control mode is changed. Under the perfect power control, since the initial power level of the open loop power control is the same as the last power level of the closed loop power control, the MS power compensation value Offset_SS$_{perSS}$ will be zero. However, in the case of a disparity between the UL path loss and the UL path loss, the abrupt change of the transmit power in the mode change is avoided by compensating for the disparity using the MS power compensation value.

Figure 3:
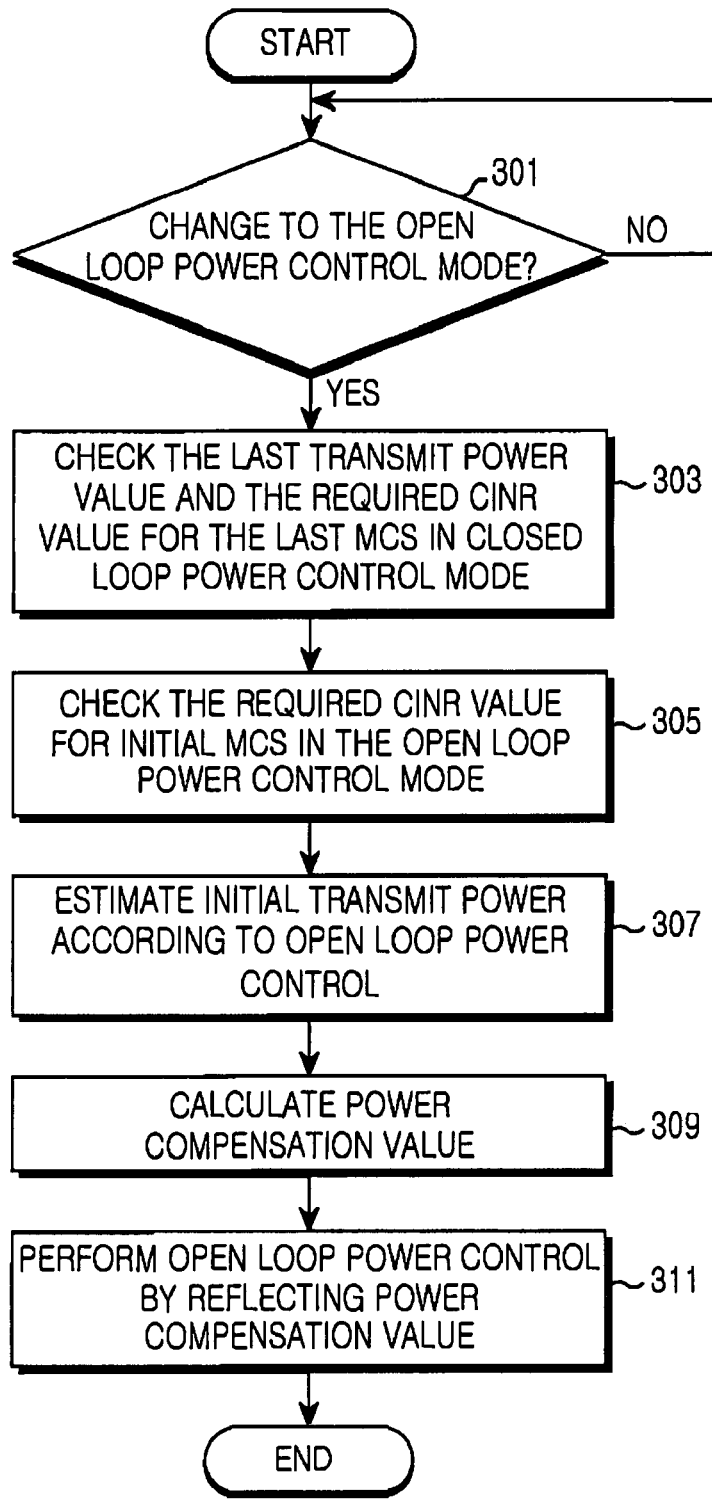
FIG. 3 illustrates a procedure for performing an uplink (UL) open loop power control in the broadband wireless communication system according to the present invention.

FIG. 3 illustrates a procedure for performing the UL open loop power control in the broadband wireless communication system according to the present invention.

In FIG. 3, in step 301 the MS determines if the power control mode is changed to the open loop power control. The power control mode is changed using the PMC_RSP message received from the BS as described earlier. Upon receiving the PMC_RSP message from the BS, the MS recognizes the mode change request to the open loop power control, transmits the PMC_REQ message to the BS in reply to the PMC_RSP message, and then enters the open loop power control.

When entering the open loop power control mode, in step 303 the MS determines the last transmit power value in the closed loop power control mode and the required CINR value for the last MCS level. In step 305, the MS determines the required CINR value for the initial MCS level of the UL burst which will be transmitted after changing to the open loop power control mode.

In step 307, the MS estimates the initial transmit power to be used after changing to the open loop power control mode based on Equation (3). In step 309, the MS calculates the MS power compensation value Offset_SS$_{perSS}$ using the last transmit power value $P_{Tx,CL\_last}$ of the closed loop power control mode, the required CINR value for the last MCS level, the required CINR value for the initial MCS level, and the initial transmit power estimation value $P_{Tx,OL\_init}$. The MS power compensation value can be acquired from Equation (2) or Equation (5).

After computing the MS power compensation value Offset_SS$_{perSS}$, the MS performs the open loop power control by reflecting the MS power compensation value into Equation (1) in step 311.

As set forth above, in a broadband wireless access communication system such as an OFDMA system, when changing the power control mode to the open loop power control mode, the open loop power control can be stably carried out even with a disparity between the UL path loss and the DL path loss. In other words, by keeping the proper receive power level of the BS for the UL packet transmission, the stable open loop power control can be achieved and the UL performance can be enhanced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A Mobile Station (MS) in a wireless communication system, comprising:
a power controller for acquiring a last transmit power value $P_{Tx,CL\_last}$ in a closed loop power control mode, a path loss value $L_{OL\_init}$ estimated at the MS, a latest Noise and Interference (NI) value $NI_{OL\_init}$ received from a Base Station (BS), a required Carrier to Interference and Noise Ratio value (CINR value) $C/N_{CL\_last}$ for a last Modulation and Coding Scheme (MCS) level in the closed loop power control mode, and a repetition factor $R_{CL\_last}$ according to the last MCS level, when a power control mode is changed from a closed loop power control to an open loop power control, calculating a power compensation value Offset_SS$_{perSS}$ using the acquired values, and determining a transmit power level P according to the open loop power control using the power compensation value; and
a transmitter for adjusting a transmit power of an Uplink (UL) signal according to the determined transmit power level P.

2. The MS of claim 1, wherein the power controller calculates the power compensation value Offset_SS$_{perSS}$ based on $$\text{Offset\_SS}_{perSS} = P_{Tx,CL\_last} - (L_{OL\_init} + NI_{OL\_init}) - C/N_{CL\_last} + 10\log_{10}(R_{CL\_last}).$$

3. The MS of claim 1, wherein the power controller determines a transmit power level P according to the open loop power control based on $$P = L + C/N + NI - 10\log_{10}(R) + \text{Offset\_SS}_{perSS} + \text{Offset\_BS}_{perSS}$$

where P is a transmit power (dBm) value per subcarrier of UL burst, L is an estimation value for path loss, C/N is a CINR value required by an MCS level of the UL burst, NI is a Noise and Interference (NI) power (dBm) estimation value at the BS, R is a number of repetitions (repetition factor) according to the MCS level, Offset_SS$_{perSS}$ is an MS power compensation value controlled by the MS, and Offset_$_{BSperSS}$ is a BS power compensation value controlled by the BS.

4. The MS of claim 1, further comprising:
a power measurer for measuring a receive power of a preamble received from the BS and providing the measured receive power to the power controller,
wherein the power controller estimates UL path loss using the BS transmit power value received from the BS and the receive power fed from the power measurer, and uses the estimated path loss during the open loop power control.

5. The MS of claim 1, wherein the power control mode is changed using a Power control Mode Change ReSPonse (PMC_RSP) message from the BS.

6. The MS of claim 1, wherein the power compensation value Offset_SS$_{perSS}$ is calculated when the power control mode is changed, and is maintained until the power control mode is changed.

7. An uplink (UL) power control method in a wireless communication system, the method comprising:
calculating a power compensation value using a last transmit power in a previous closed loop power control when a power control mode is changed from a closed loop power control to an open loop power control; and
determining a transmit power according to the open loop power control using the power compensation value,
wherein the power compensation value Offset_SS$_{perSS}$ is calculated based on $$\text{Offset\_SS}_{perSS} = P_{Tx,CL\_last} - P_{Tx,OL\_init} + \Delta CINR_{req}$$

where $P_{Tx,CL\_last}$ is a last transmit power value in a closed loop power control mode, $P_{Tx,OL\_init}$ is an initial transmit power estimation value after the change to the open loop power control mode, and $\Delta CINR_{req}$ is a difference between a required Carrier to Interference and Noise Ratio (CINR) value for an initial Modulation and Coding Scheme (MCS) level in the open loop power control mode and a required CINR value for the a last MCS level in the closed loop power control mode.

8. An uplink (UL) power control method in a wireless communication system, comprising:
acquiring, when a power control mode is changed from a closed loop power control to an open loop power control, a last transmit power value $P_{Tx,CL\_last}$ in a closed loop power control mode, a path loss value $L_{OL\_init}$ estimated at a Mobile Station (MS), a latest Noise and Interference (NI) value $NI_{OL\_init}$ received from a Base Station (BS), a required CINR value $C/N_{CL\_last}$ for a last Modulation and Coding Scheme (MCS) level in the closed loop power control mode, and a number of repetitions $R_{CL\_last}$ according to the last MCS level; and
calculating a power compensation value Offset_SS$_{perSS}$ controlled by the MS using the acquired values; and
determining a transmit power level P according to the open loop power control using the power compensation value Offset_SS$_{perSS}$.

9. The UL power control method of claim 8, further comprising:
adjusting a UL signal power level P to the determined transmit power and transmitting the UL signal.

10. The UL power control method of claim 8, wherein the power compensation value Offset$_{\_SSperSS}$ is calculated based on $$\text{Offset\_SS}_{perSS} = P_{Tx,CL\_last} - (L_{OL\_init} + NI_{OL\_init}) - C/N_{CL\_last} + 10\log_{10}(R_{CL\_last}).$$

11. The UL power control method of claim 8, wherein a transmit power level P according to the open loop power control is determined based on $$P = L + C/N + NI - 10\log_{10}(R) + \text{Offset\_SS}_{perSS} + \text{Offset\_BS}_{perSS}$$

where P is a transmit power (dBm) value per subcarrier of UL burst, L is an estimation value for path loss, C/N is a CINR value required by an MCS level of the UL burst, NI is an NI power (dBm) estimation value at the BS, R is a number of repetitions (repetition factor) according to the MCS level, Offset_SS$_{perSS}$ is an MS power compensation value controlled by the MS, and Offset_BS$_{perSS}$ is a BS power compensation value controlled by the BS.

12. The UL power control method of claim 8, wherein the power control mode is changed using a Power control Mode Change ReSPonse (PMC_RSP) message from the BS.

13. The UL power control method of claim 8, wherein the power compensation value Offset_SS$_{perSS}$ is calculated when the power control mode is changed, and is maintained until the power control mode is changed.

14. A power control apparatus in a wireless communication system, comprising:
   means for acquiring, when a power control mode is changed from a closed loop power control to an open loop power control, a final transmit power value P$_{Tx,CL\_last}$ in a closed loop power control mode, a path loss value L$_{OL\_init}$ estimated at a Mobile Station (MS), a latest Noise and Interference (NI) value NI$_{OL\_init}$ received from a Base Station (BS), a required CINR value C/N$_{CL\_last}$ for a last Modulation and Coding Scheme (MCS) level in the closed loop power control mode, and a number of repetitions R$_{CL\_last}$ according to the last MCS level; and
   means for calculating a power compensation value Offset_SS$_{perSS}$ controlled by the MS using the acquired values based on $$\text{Offset\_SS}_{perSS} = P_{Tx,CL\_last} - (L_{OL\_init} + NI_{OL\_init}) - C/N_{CL\_last} + 10\log_{10}(R_{CL\_last}).$$

15. A Mobile Station (MS) in a wireless communication system, comprising:
   a power controller for calculating a power compensation value using a final transmit power in a previous closed loop power control when a power control mode is changed from a closed loop power control to an open loop power control, and determining a transmit power according to the open loop power control using the power compensation value; and
   a transmitter for adjusting and transmitting the transmit power of an uplink (UL) signal under control of the power controller,
   wherein the power controller calculates the power compensation value Offset_SS$_{perSS}$ based on $$\text{Offset\_SS}_{perSS} = P_{Tx,CL\_last} - P_{Tx,OL\_init} + \Delta CINR_{req}$$

where P$_{Tx,CL\_last}$ is a final transmit power value in the closed loop power control mode, P$_{Tx,OL\_init}$ is an initial transmit power estimation value after the change to the open loop power control mode, and $\Delta CINR_{req}$ is a difference between a required Carrier to Interference and Noise Ratio (CINR) value for an initial Modulation and Coding Scheme (MCS) level in the open loop power control mode and a required CINR value for a last MCS level in the closed loop power control mode.

* * * * *